(12) United States Patent
Ferretti et al.

(10) Patent No.: US 10,757,236 B2
(45) Date of Patent: Aug. 25, 2020

(54) HANDHELD SYSTEM FOR THREE-DIMENSIONAL SCANNING WITH A SMARTPHONE

(71) Applicant: BIONDI ENGINEERING SA, Cadempino (CH)

(72) Inventors: Daniele Ferretti, Cureglia (CH); Marco Baruzzi, Cureglia (CH); Andrea Biondi, Cureglia (CH)

(73) Assignee: BIONDI ENGINEERING SA (CH)

( * ) Notice: Subject to any disclaimer, the term of this patent is extended or adjusted under 35 U.S.C. 154(b) by 80 days.

(21) Appl. No.: 16/097,311

(22) PCT Filed: Apr. 28, 2017

(86) PCT No.: PCT/IB2017/052460
§ 371 (c)(1),
(2) Date: Oct. 29, 2018

(87) PCT Pub. No.: WO2017/187393
PCT Pub. Date: Nov. 2, 2017

(65) Prior Publication Data
US 2020/0177720 A1  Jun. 4, 2020

(30) Foreign Application Priority Data

Apr. 29, 2016  (IT) .................. 102016000043942

(51) Int. Cl.
*H04M 1/04* (2006.01)
*G01B 11/24* (2006.01)
*H04N 5/225* (2006.01)

(52) U.S. Cl.
CPC ............ *H04M 1/04* (2013.01); *H04N 5/2253* (2013.01); *G01B 11/24* (2013.01)

(58) Field of Classification Search
None
See application file for complete search history.

(56) References Cited

U.S. PATENT DOCUMENTS

| | | | | |
|---|---|---|---|---|
| 7,811,493 | B2* | 10/2010 | Fanucci | B63B 3/56 |
| | | | | 264/171.1 |
| 9,809,049 | B2* | 11/2017 | Franco | B43L 1/00 |
| 10,245,878 | B2* | 4/2019 | Franco | B43L 1/00 |
| 10,376,760 | B2* | 8/2019 | Huffa | D03D 1/00 |
| 2012/0320340 | A1* | 12/2012 | Coleman, III | A61B 3/14 |
| | | | | 351/208 |

(Continued)

FOREIGN PATENT DOCUMENTS

| | | | |
|---|---|---|---|
| CN | 202812714 U | 3/2013 | |
| CN | 204805907 U | * 11/2015 | ............. F16M 13/04 |

OTHER PUBLICATIONS

International Search Report and Written Opinion for PCT/IB2017/052460 dated Jul. 4, 2017.

*Primary Examiner* — Reza Aghevli
(74) *Attorney, Agent, or Firm* — Thomas Horstemeyer, LLP

(57) ABSTRACT

The system according to the present invention enables a sensor to be applied compactly and economically, in particular for a three-dimensional scan to a smartphone, enabling it to control its main functions with one hand. The peculiar features of this system include the simplicity of mating with the smartphone and the ergonomic design that allows it to be used with one hand.

7 Claims, 6 Drawing Sheets

(56) References Cited

U.S. PATENT DOCUMENTS

| | | | |
|---|---|---|---|
| 2013/0069381 A1* | 3/2013 | Sakamoto | A45F 5/10 294/142 |
| 2013/0127980 A1* | 5/2013 | Haddick | G06F 3/013 348/14.08 |
| 2013/0219960 A1* | 8/2013 | Gerard-Goddet | A44C 5/0053 63/3.2 |
| 2014/0128132 A1* | 5/2014 | Cox, III | H04B 1/3888 455/575.8 |
| 2015/0099259 A1* | 4/2015 | Franco | B43L 1/00 434/413 |
| 2015/0358452 A1* | 12/2015 | Kranz | A61B 5/04087 455/557 |
| 2015/0365119 A1* | 12/2015 | Shin | H04M 1/0233 455/575.1 |
| 2016/0072933 A1* | 3/2016 | Cox, III | H04M 1/185 455/575.8 |

* cited by examiner

HANDHELD SYSTEM FOR THREE-DIMENSIONAL SCANNING WITH A SMARTPHONE

CROSS-REFERENCE TO RELATED APPLICATION

This application is the 35 U.S.C. § 371 national stage application of PCT Application No. PCT/IB2017/052460, filed Apr. 28, 2017, where the PCT claims the priority to and benefit of Italian Patent Application No. 102016000043942, filed Apr. 29, 2016, both of which are herein incorporated by reference in their entireties.

The present invention relates to an improved handheld system for three-dimensional scanning with a smartphone.

More in detail, the present invention relates to a system that enables to apply in a compact and ergonomic way a sensor for the optical detection of objects, in particular the three-dimensional scanning, to a smartphone, enabling it to control its main functions with one hand. The peculiar features of this system include the simplicity of mating with the smartphone and the ergonomic design that allows it to be used with one hand.

PRIOR ART

Peripherals for smartphones are known, which connect to the latter through the classic micro-USB port or equivalent. An example is the external batteries.

However, this type of peripheral connects through USB or equivalent cables, and those who use the smartphone must hold the phone with one hand and with the other they must hold the external device, unless it is made rest on other support such as a pocket.

In all cases, the handiness of the smartphone-peripheral assembly is jeopardized. This is quite critical in those cases where the external peripheral has to work with internal peripherals for coordinated acquisitions.

Even when the external optical device is fast connected to the phone, the handiness and compactness of the assembly is compromised. In any case, two hands are required to operate on the device.

We refer in particular to the methods implemented on smartphones of patent applications WO2016020826 and PCT/IB/2016/051058 in the name of this Applicant, which are intended to use additional optical means that cooperate accurately and with the camera of the smartphones and with the software loaded thereon for precision animal husbandry surveys.

The use of these methods without the adequate connection of additional means to the smartphone is problematic and in any case inefficient for a large-scale industrial application.

A patent application US 2013/0069381 A1 is known to conveniently handle a smartphone or other handheld electronic device. It is made up of a kind of arch handle that connects in a removable way to a cover for the handheld device. The cover in turn hooks mechanically to the handheld device by hooking up its edges. The arm will be inserted into the arc handle until the latter is in contrast to the wrist and the hand will engage the edge of the cover. Obviously, the user will need the other hand to intergrate with the handheld device. Also, beyond the grip, the described device does not include sensors or data communication. Using this hardware would require that the grip be made to direct the sensor properly and should take into account the weights at stake. In any case, two hands would be required to use the overall system.

The device described in US 2012/0320340 A1 is basically an adapter to connect a ophthalmoscope to the camera of a smartphone, so that the two are optically in line. There is a data connection between the ophthalmoscope and the smartphone via a USB connection. The adapter is connected to a handle that supports the smartphone-ophthalmoscope set with one hand while the other is free to drive the same set to locate it more precisely with the patient's optical axis or interact with the smartphone's touch screen. Two hands are still indispensable, and the adapter needs a cover to connect to the smartphone, the USB jack being fixed to the cover and not the body of the ophthalmoscope.

The above-mentioned handle is therefore necessary based on the foregoing, i.e. the use of a sensor moves the weight distribution and aggravates even more the need to use two hands.

There is a need for a different sensor system connectable through physical and data connection to a smartphone in such a way that, in use, the set consisting of the sensor system and the smartphone can be manually operated with one hand in an easy and effective way for an extended period of time.

The object of the present invention is to provide a system that solves the problems and overcomes the drawbacks of the prior art.

It is subject-matter of the present invention a system according to the appended claims, which form an integral part of the present description.

The invention will now be described by way of illustration but not by way of limitation, with particular reference to the figures of the accompanying drawings, in which.

DETAILED DESCRIPTION OF EMBODIMENTS OF THE INVENTION

Wherever in this description and in the appended claims is included the case where the word "includes" is replaced by the word "consists of". Moreover, elements of the embodiments can be extracted from the same and also used independently of the other elements and details.

Figure 1:
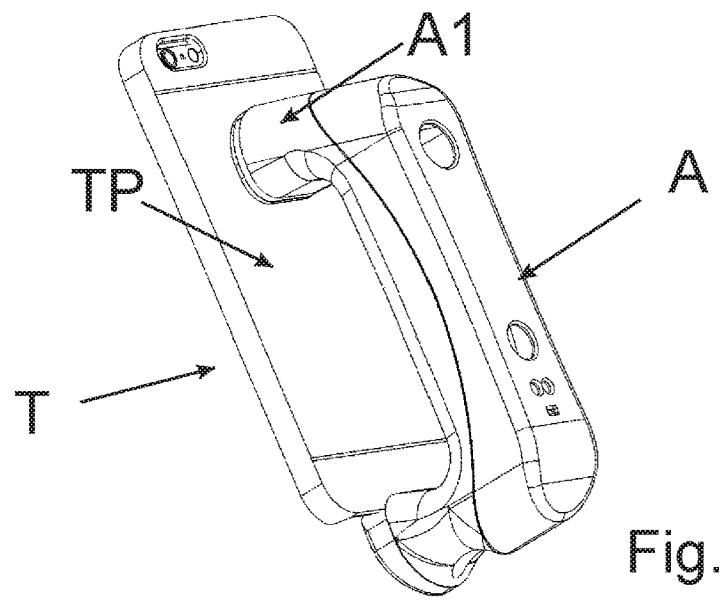
FIG. 1 shows an embodiment of the device according to the invention, in a position attached to the smartphone in a perspective view.

FIG. 1 shows the scanning system (or more generally a peripheral) A mounted and connected to the smartphone T. The smartphone T has a front face (not visible) and a rear face TP opposite to the front face, both of which are the broader faces. System A includes or consists of an elongated bridge element. In fact, said outer peripheral is an elongated bridge element 3,4 with a first end A1 and a second end A2 opposite to the first end A1, connected together by a body so as to form a "C".

Figure 2:
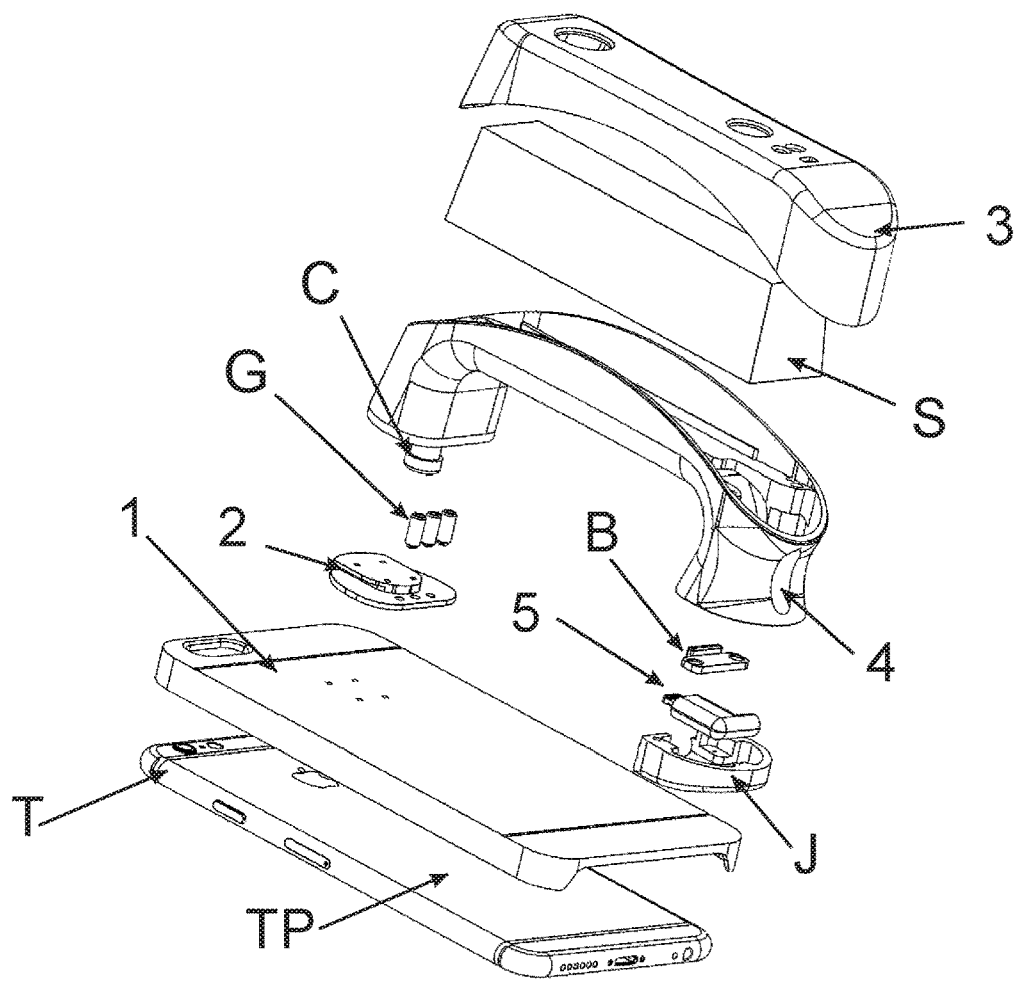
FIG. 2 shows an exploded perspective view of the device of FIG. 1.
Figure 3:
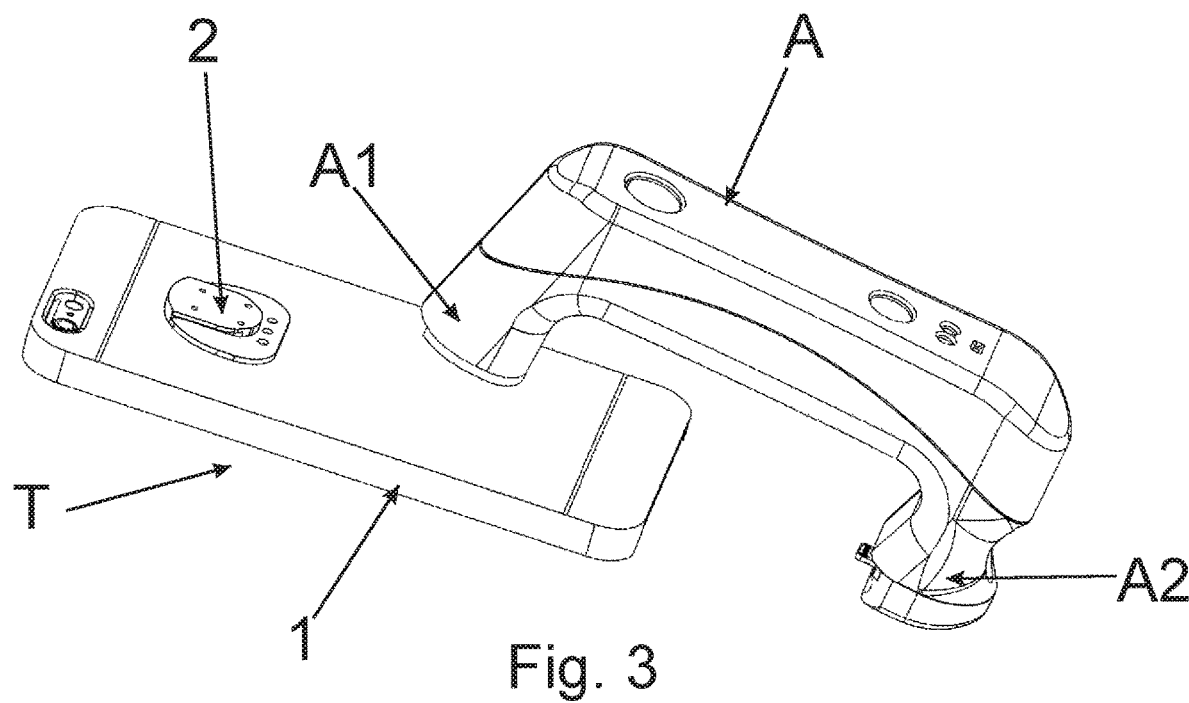
FIG. 3 shows a perspective view of the device of FIG. 1 in a position wherein it is detached from the smartphone
Figure 4:
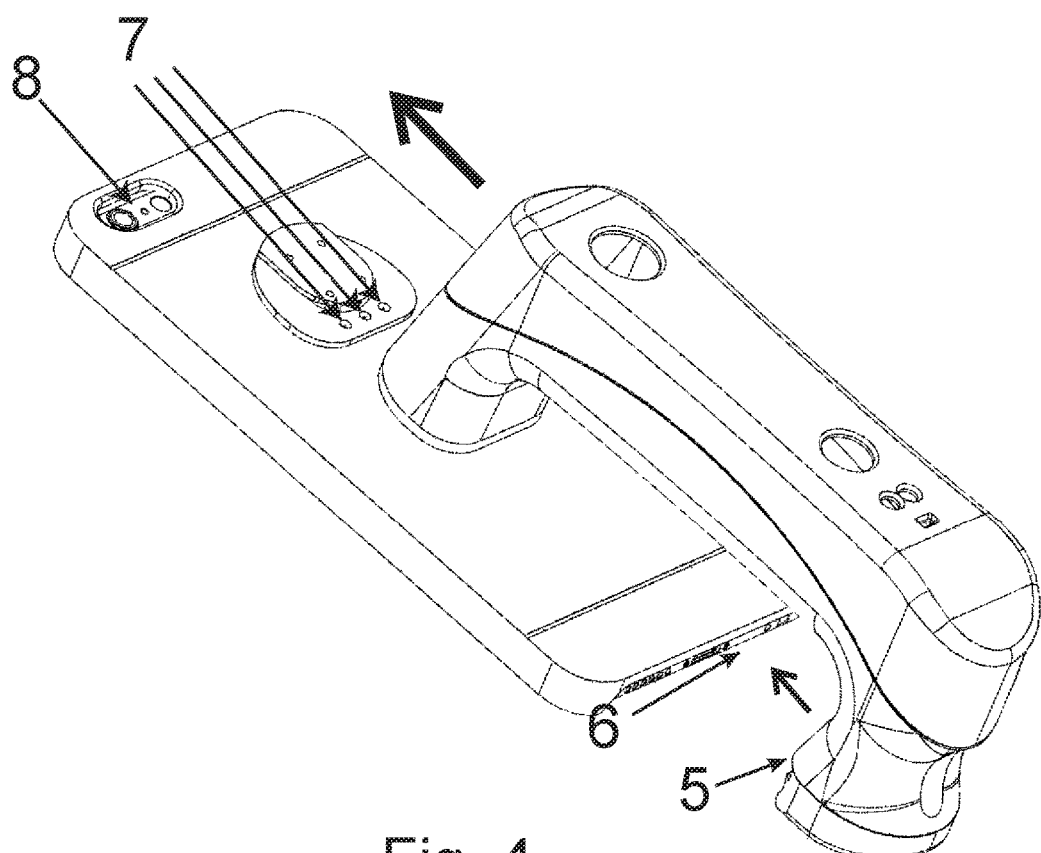
FIG. 4 shows a perspective view of the device of FIG. 1 in a first step of the connection to the smartphone.
Figure 5:
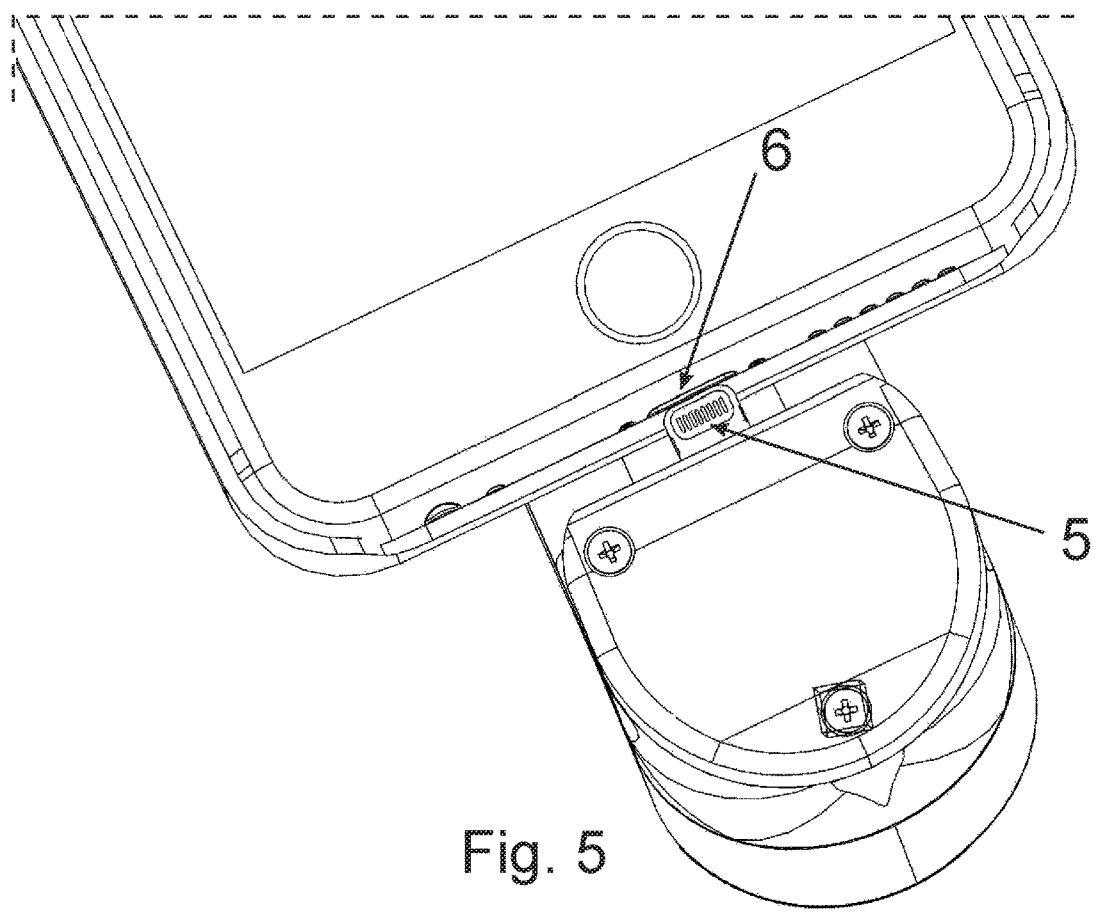
FIG. 5 shows a detail of the device of FIG. 1 connected to the smartphone, in a plane view.

FIG. 2 shows the explosion of the system A, in which it is seen that the sensor S is enclosed between the mechanical elements 3 and 4, whose junction may be of a sealed type, by means of suitable sealing O-rings. The sensor S can be, for example, a three-dimensional scanner (e.g. flight time or time of flight or TOF, triangulation, stereographic) for detecting the three-dimensionality of things, animals or people, or a thermal camera or thermographic camera (device for the detection of heat emitted by bodies by means of specific CCDs sensitive to infrared radiation and capable of producing images or thermographic images), or (e.g., time of flight TOF, ultrasonic) telemeters to determine the distance of an object or phonometers, or electromagnetic field meters or radioactivity gauges, or any type of physical parameter measurement sensor that can be advantageously connected to a smartphone and controlled by appropriate application software. The object to be detected (relevant physical parameters) can be animate or inanimate or it can be about to detect signals or parameters from the environment or part of it.

Figure 8:
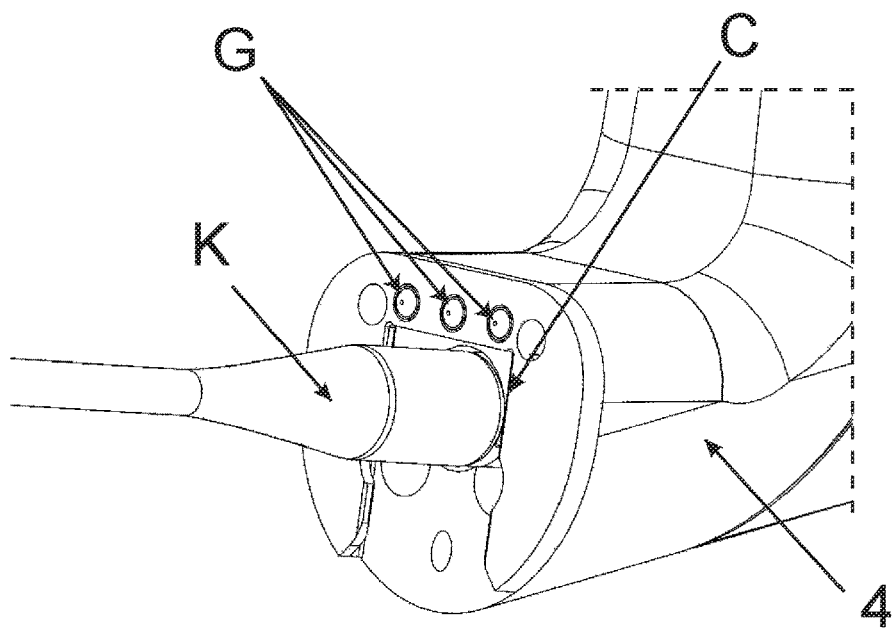
FIG. 8 shows a detail of the device according to the invention connected to a power supply cable (not shown) for charging.

Element 4 is in the shape of "C" or bridge, in the following we will see that this has a technical consequence. As shown in FIG. 8, element 4 comprises an internal electric accumulator (not shown) and at one of its two ends it accommodates socket C for charging such an accumulator.

Figure 7:
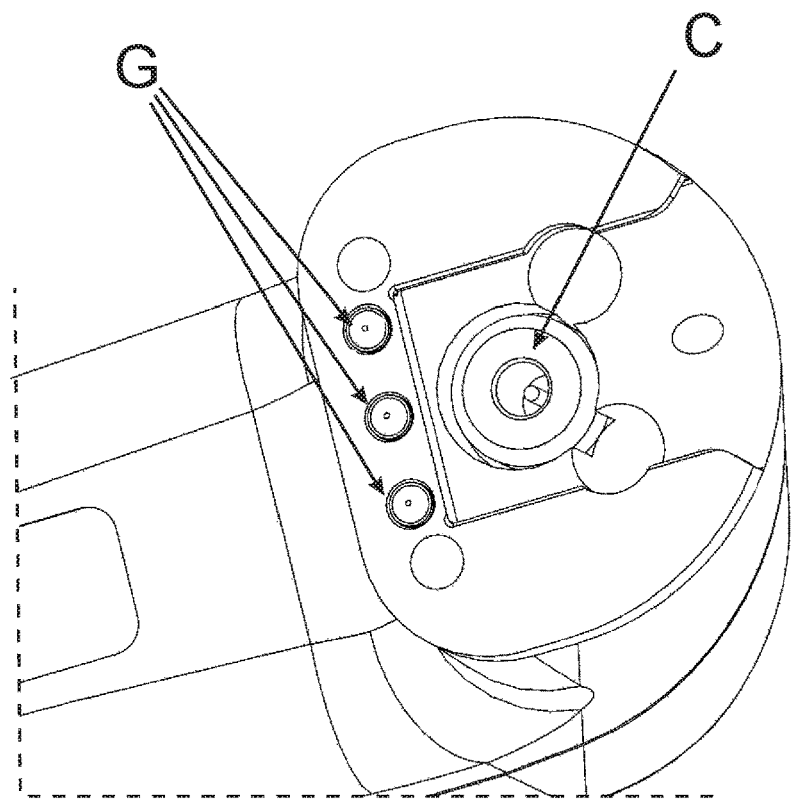
FIG. 7 shows a detail of the connection means of the device of FIG. 1.

Element 4 generally comprises removable connection means to slide or mechanical guide 2. In FIGS. 7 and 8, it can be seen that such connection means comprise grain (headless screws) G having a spring ball (the spring makes bias and the sphere remains just outside one end of the grain), which allow a better coupling between the mechanical element 4 and the slide 2, mounted on cover 1 of the smartphone. The plurality of locking elements G (even more generally according to the invention, it will be referred to as removable engagement means G for engagement to said mechanical guide 2) is thus constituted in an embodiment by a spring-type ball-shaped grains, wherein each sphere is configured to engage with a respective concavity of said plurality of concavities 7.

Element 4 at the other end houses connector 5, secured to the optimum position for coupling with the micro-USB socket or equivalent of the smartphone. Element B crushes connector 5, by means of two screws, onto the J element that closes the end. The element J is in turn secured by means of screws at the end of the element 4. The coupling between the mechanical elements J and 4 can also be of a sealed type.

The system according to the invention may include a smartphone cover to which a sliding guide 2 is attached, as well as an external device A. In other embodiments, there is no cover and the slide guide is attached directly to the outside surface of the phone. The device (external peripheral) A connects to both the slide guide or micro-USB jack or equivalent of the smartphone.

FIGS. 3, 4, 5 and 6 illustrate the method of coupling between system A and mobile phone T, provided with cover 1 with slide guide 2. System A is slid longitudinally along the back of cover 1 until it meets slide guide 2. After a first insertion phase, system A is aligned with the smartphone T so that the system connector 5 is plugged into the micro-USB socket (or equivalent, depending on the smartphone brand) 6 of the smartphone. The coupling between system A and the smartphone is completed when the spring-type ball-shaped grains fall into the respective cavities of slide guide 2. This ensures a balanced coupling and avoids excessive stress at the junction point between connector 5 and socket 6.

Figure 6:
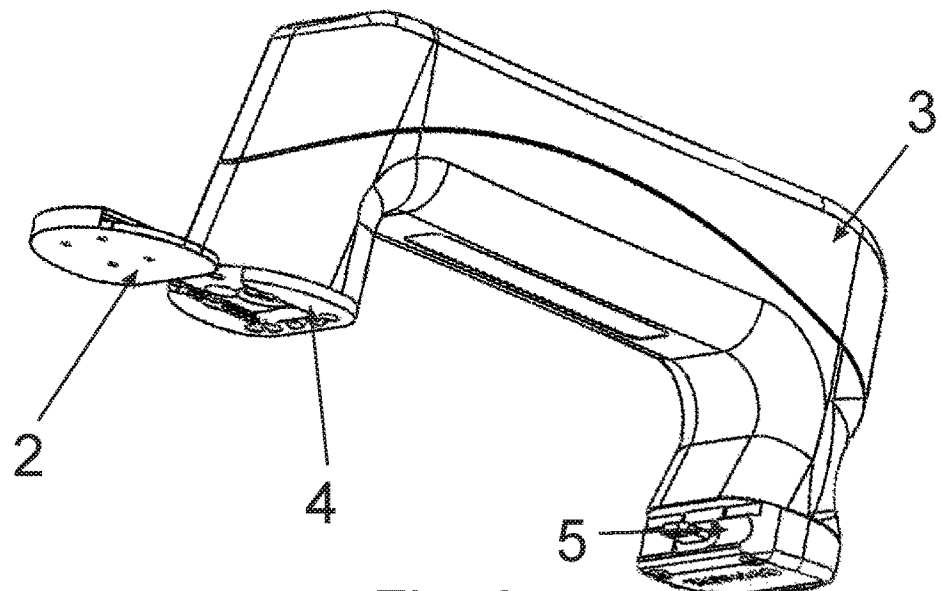
FIG. 6 shows a perspective view of the device according to the invention, without the smartphone.

FIG. 6 shows the alignment with the slide in a different perspective view (from below).

FIG. 7 illustrates in greater detail element 4 wherein socket C for recharge of the internal battery and the spring-type ball-shaped G are housed.

FIG. 8 illustrates the coupling between the jack K (micro-USB or equivalent), which comes from a suitable power supply, and the socket C of the system A for charging the battery inside the device A (or rigidly connected to it). It is clear that charging occurs when device A is not connected to the smartphone. In an embodiment, socket C may also not be present, because element 4 is recharged from the smartphone through the micro-USB socket. In a different embodiment, element 4 recharges the smartphone since it is provided with a more powerful battery.

Figure 9:
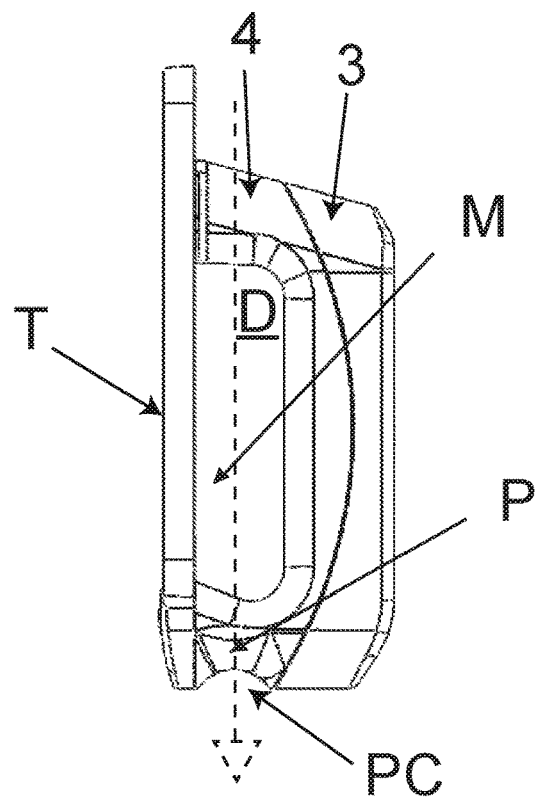
FIG. 9 shows a side view of the device according to the invention attached to the smartphone.
Figure 10:
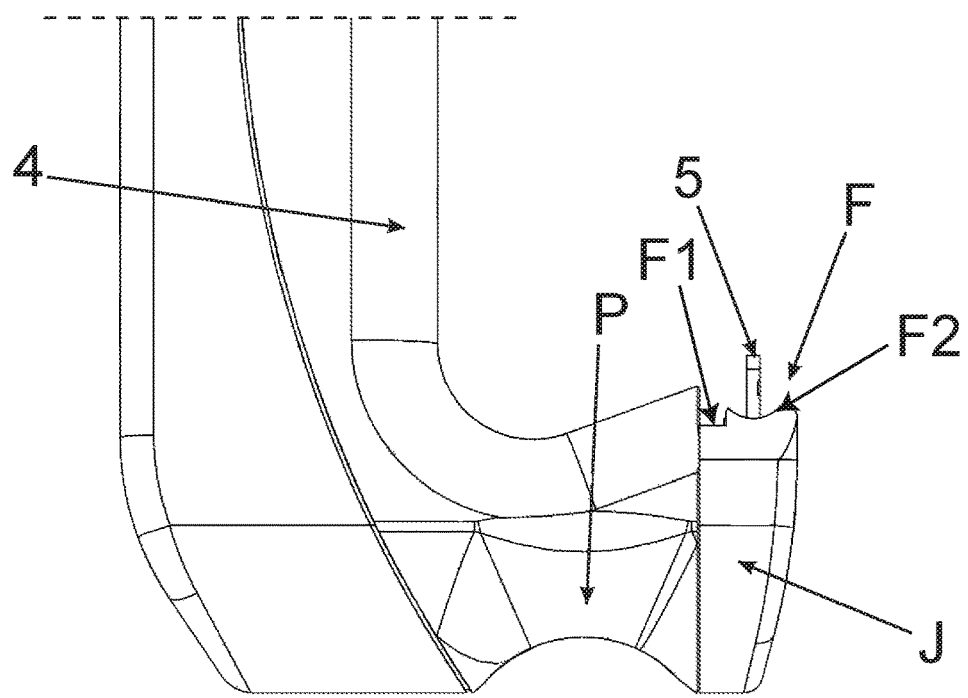
FIG. 10 shows in detail the micro-USB connection system, lightening connector or analog of a side view of the device according to the invention, not attached to the smartphone.

FIGS. 9 and 10 illustrate the ergonomic shape of system A so that it can be controlled by one hand. Let us number the fingers from 1 to 5 from thumb to litter finger. The technical concept is to start with the classic handgrip of the phone, clamped between the tips of the fingers and the thumb, to get a secure grip and at the same time the ability to operate on the touchscreen of the smartphone with the thumb.

To this end, the bridge shape of the element 4 allows the insertion of the fingers 2, 3 and 4 in the region M between the cover 1 and the element 4. Moreover, the shape of the region P of the element 4 is such as to form a concavity PC that allows the passage of the fifth finger outside the bridge M (the concavity PC being turned in a direction D approximately parallel to the back face of the smartphone and moving away from the space M downwards (when the smartphone points its USB socket towards the ground)).

The special shape (optional) of element J in section F allows the mechanical stresses to be discharged on the system structure, avoiding excessive stress on connector 5 and socket 6. The "C"-shaped groove F2 (open towards the smartphone connection direction) on the jack 5 provides stability compared to the lower end of the phone, while the square groove F1 (optional) provides stability because it engages with the section of the phone cover 1.

Figure 11:
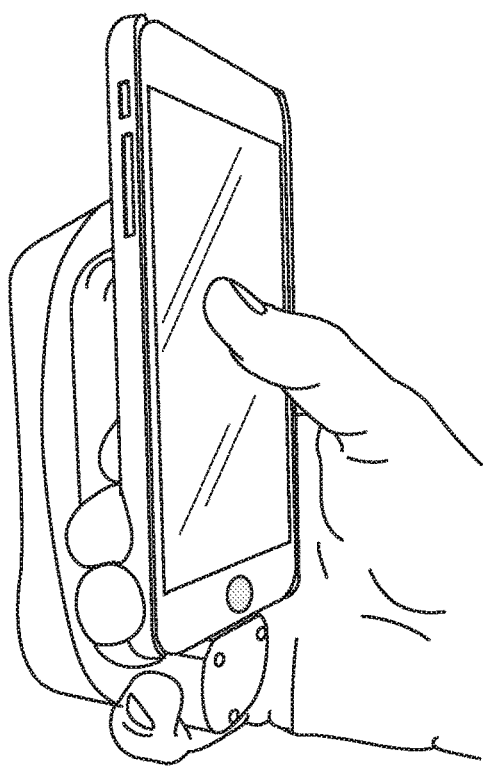
FIG. 11 is a first perspective view of the device used according to the invention.
Figure 12:
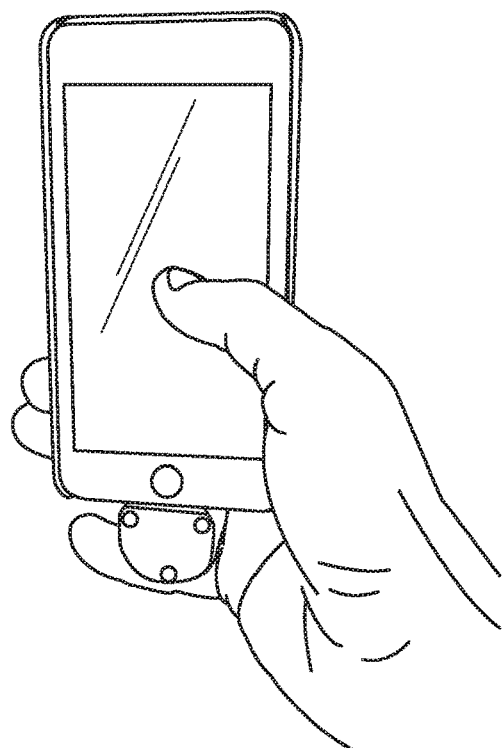
FIG. 12 is a second front view of the device used according to the invention.

FIGS. 11 and 12 illustrate the particular handle of the system, which allows easy control of the functions of the device by engaging a single hand.

It is here to be stated that said mechanical guide 2 and said bridge elongated device 3,4 have a weight distribution such that the center of gravity of the overall system constituted by the use of the three-dimensional scan system 2,3,4 and the smartphone T falls on a plane substantially parallel to said rear face TP and intersecting said concavity PC. This ensures that the overall system can be used with one hand for hours without effort.

Obviously, the smartphone weights on the market are known and therefore the distribution of weights of the three-dimensional scanning system according to the invention can be calculated a priori for each model. Alternatively, one can proceed to a weighing distribution that is directed to run at an average weight of a smartphone business range, and this is effective because in every range, the smartphones of different brands have a similar weight.

Preferably, the above parallel plan includes essentially the direction D, and therefore falls right or substantially at the center of the cavity PC and substantially along the fingertips of the holding hand.

With the system according to the invention, it is possible to provide a smartphone with an external peripheral that remain in a position that is fixed and determined a priori with respect to the other internal devices of the smartphone. In addition, the particular innovative shape of the container of the outer peripheral according to the invention allows to hold the smartphone+peripheral assembly with one hand and then to use that complex for large-scale detection methods, for example in, but not limited to, precision zootechnics field.

For example, if one wants to take three-dimensional shooting of a live animal, the technician must enter the enclosure and approach a few meters from the animal. Normally, technicians who have to approach these animals, for example to perform a body condition scoring, have a small stick, used as a deterrent to the animals themselves. This makes it impossible to control the operation of devices that require the use of two hands. Even in the case of devices that integrate one or more control buttons with a grip similar to that of a gun, interaction with the device is limited to the functions associated with the buttons.

The present invention allows to hold the smartphone and the detection system firmly with one hand, allowing access to all available features on the touch screen using the thumb of the same hand. The other hand is free to hold the stick, carry other tools, or allow the operator to lean.

In the foregoing, the preferred embodiments have been described and variants of the present invention have been suggested, but it is to be understood that those skilled in the art will be able to make modifications and changes without thereby falling outside the scope of protection as defined by the attached claims.

The invention claimed is:

1. A three-dimensional scanning system connectable to a smartphone and controllable via the smartphone user interface, provided with a front face and a rear face opposite to the front face, as well as a micro-USB or lightening port, wherein the three-dimensional scanning system comprises:
   an elongated bridge device for three-dimensional scanning, which has a first end and a second end opposite to the first end, which are rigidly connected through a body to form a "C";
   a removable fastening means of said elongated bridge device for fastening it to said rear face or a cover for said rear face;
   a micro-USB or lightening jack rigidly secured to said second end of said elongated bridge device for data connection with the smartphone;
   a sensor for the three-dimensional scanning fixed to said body so that, in use, the sensor points in a direction away from said rear face or said cover; the three-dimensional scanning system being characterized in that:
   the removable fastening means comprises:
   a mechanical guide separated from said elongated bridge device and that can be fastened to said rear face or to the cover for said rear face;
   a removable engagement means for engagement to said mechanical guide provided on said first end of said elongated bridge device;
   said mechanical guide and said elongated bridge device are configured in such a way that, by making said removable engagement means slide along said rear face or said cover, said removable engagement means are rigidly connected to said mechanical guide, and said micro-USB or lightening jack is simultaneously inserted into said smartphone micro-USB or lightening port;
   said elongated bridge device forms, in use, an empty space with said rear face of the smartphone, the empty space having dimensions such as to allow one or more fingers of one hand to be inserted;
   said second end is configured to present a concavity facing a direction away from said empty space, said concavity being configured to receive at least partially an annular or little finger; and
   said sensor is powered by a battery fixed to or enclosed in said body, wherein said mechanical guide and said elongated bridge device have a weight distribution such that the center of gravity of the overall system constituted, in use, by the three-dimensional scanning system and the smartphone falls on a plane parallel to said rear face and intersecting said concavity.

2. The system according to claim 1, wherein said parallel plane substantially comprises the direction.

3. The system according to claim 1, wherein:
   said mechanical guide has a plurality of concavities on the surface not connected to said rear face; and
   said first end has a plurality of locking elements configured to engage reversibly with said plurality of concavities.

4. The system according to claim 3, wherein said plurality of locking elements are made of spring balls grains, each ball being capable of engaging with a respective concavity of said plurality of concavities.

5. The system according to claim 1, wherein said second end has a first stabilization concavity on the surface wherein said micro-USB jack or equivalent inserts, the first stabilization concavity being configured to mate in shape with the corresponding surface of said smartphone, to provide mechanical stability.

6. The system according to claim 5, wherein said second end has a second stabilization concavity near said first stabilization concavity configured to couple with the corresponding cover surface in order to provide mechanical stability.

7. The system according to claim 1, wherein said first end is provided with a socket for charging, when not in use, said battery.

* * * * *